(12) United States Patent
Blask et al.

(10) Patent No.: US 7,304,645 B2
(45) Date of Patent: Dec. 4, 2007

(54) SYSTEM AND METHOD FOR IMPROVING SIGNAL TO NOISE RATIO IN 3-D POINT DATA SCENES UNDER HEAVY OBSCURATION

(75) Inventors: Steven G. Blask, Melbourne, FL (US);
Tim Faulkner, Palm Bay, FL (US);
Mark Rahmes, Melbourne, FL (US)

(73) Assignee: Harris Corporation, Melbourn, FL (US)

( * ) Notice: Subject to any disclaimer, the term of this patent is extended or adjusted under 35 U.S.C. 154(b) by 213 days.

(21) Appl. No.: 10/892,055

(22) Filed: Jul. 15, 2004

(65) Prior Publication Data

US 2006/0012599 A1  Jan. 19, 2006

(51) Int. Cl.
*G60T 17/00* (2006.01)
(52) U.S. Cl. ..................................... 345/424
(58) Field of Classification Search .................... None
See application file for complete search history.

(56) References Cited

U.S. PATENT DOCUMENTS

| | | | | |
|---|---|---|---|---|
| 4,751,643 | A * | 6/1988 | Lorensen et al. | 382/132 |
| 5,354,981 | A | 10/1994 | Dyck | |
| 5,963,211 | A * | 10/1999 | Oikawa et al. | 345/424 |
| 5,966,672 | A * | 10/1999 | Knupp | 702/16 |
| 6,246,468 | B1 | 6/2001 | Dimsdale | |
| 6,330,523 | B1 | 12/2001 | Kacyra | |
| 6,342,886 | B1 * | 1/2002 | Pfister et al. | 345/424 |
| 6,407,738 | B1 * | 6/2002 | Wakabayashi | 345/424 |
| 6,420,698 | B1 | 7/2002 | Dimsdale | |
| 6,473,079 | B1 | 10/2002 | Kacyra | |
| 6,512,518 | B2 | 1/2003 | Dimsdale | |
| 6,512,993 | B2 | 1/2003 | Kacyra | |
| 6,680,735 | B1 * | 1/2004 | Seiler et al. | 345/424 |
| 2002/0059042 | A1 | 5/2002 | Kacyra | |
| 2002/0145607 | A1 | 10/2002 | Dimsdale | |
| 2002/0149585 | A1 | 10/2002 | Kacyra | |
| 2002/0158870 | A1 | 10/2002 | Brunkhart | |
| 2003/0001835 | A1 | 1/2003 | Dimsdale | |
| 2004/0252870 | A1 * | 12/2004 | Reeves et al. | 382/128 |
| 2005/0243323 | A1 * | 11/2005 | Hsu et al. | 356/450 |

* cited by examiner

*Primary Examiner*—Mark Zimmerman
*Assistant Examiner*—Andrew Yang
(74) *Attorney, Agent, or Firm*—Allen, Dyer, Doppelt, Milbrath & Gilchrist, P.A.

(57) ABSTRACT

A method comprises loading LADAR point data into a three-dimensional voxel array as a plurality of components (304); determining connected components in the array (306); determining a size for each component and a hit count of occupied voxels (316); and determining whether each occupied voxel is to be written to an output file (312), wherein occupied voxels are written (312) to the output file according to a set of criteria based on statistics for determining when a voxel represents a light pulse reflected by a physical object.

11 Claims, 3 Drawing Sheets

SYSTEM AND METHOD FOR IMPROVING SIGNAL TO NOISE RATIO IN 3-D POINT DATA SCENES UNDER HEAVY OBSCURATION

STATEMENT REGARDING FEDERALLY SPONSORED-RESEARCH OR DEVELOPMENT

The invention claimed was made with Government support under Contract No: DAAD17-01-D-0004 awarded by the Defense Advanced Research Projects Agency (DARPA). The Government has certain rights in this invention.

CROSS-REFERENCE TO RELATED APPLICATIONS

This application relates to technology similar to that discussed in concurrently filed U.S. patent applications Ser. No. 10/892,047 entitled "METHOD AND SYSTEM FOR SIMULTANEOUSLY REGISTERING MULTI-DIMENSIONAL TOPOGRAPHICAL POINTS", Ser. No. 10/891,950 "BARE EARTH DIGITAL ELEVATION MODEL EXTRACTION FOR THREE-DIMENSIONAL REGISTRATION FROM TOPOGRAPHICAL POINTS", and, Ser. No. 10/892,063 entitled "METHOD AND SYSTEM FOR EFFICIENT VISUALIZATION SUPPORTING COMPARISON OF LADAR POINT DATA TO DETAILED CAD MODELS OF TARGETS" which are assigned to the same assignee as the present application and are incorporated by reference herein in their entirety.

FIELD OF THE INVENTION

The invention disclosed broadly relates to the field of image processing and more particularly relates to the field of processing point data obtained from a 3-D imaging Laser RADAR (LADAR) sensor viewing an obscured object.

BACKGROUND OF THE INVENTION

Systems for processing digital representations of images are commonly used to process data representing surfaces such as Digital Elevation Models (DEMs). A DEM is a digital map of the elevation of an area on the earth. The data is collected by any well-known means such as LADAR (Laser Detection and Ranging), or by IFSAR (Interferometric Synthetic Aperture Radar) or the like. In operation, the LADAR instrument transmits light to a target. The transmitted light interacts with and is changed by the target. Some of this light is reflected or scattered back to the sensor of the instrument where it is detected, stored, and analyzed. The change in the properties of the light enables certain properties of the target to be determined. The time required for light to travel to the target and back to the LADAR instrument is used to determine the range to the target. IFSAR is used to ingest and process high-resolution elevation data produced through a technique called radar interferometry. As in the case of LADAR, IFSAR produces data useful for extracting DEMs.

Digital elevation models (DEMs) may be represented as a height map through gray scale images wherein the pixel values are actually terrain elevation values. The pixels are also correlated to world space (longitude and latitude), and each pixel represents some variable volume of that space depending on the purpose of the model and land area depicted.

Referring to FIG. 1 there is shown an example of an airborne LADAR system 100. The system comprises a LADAR instrument 102 mounted on an aircraft 104. Below the aircraft is a target area 107 comprising the ground and a canopy formed by trees and other foliage obstructing the view of the ground (earth) from an aerial view. The LADAR instrument 102 emits a plurality of laser light pulses which are directed toward the ground. The LADAR instrument 102 comprises a sensor 103 that detects the reflections/scattering of the pulses. The LADAR instrument 102 provides 3-D data including elevation (Z) versus position (X,Y) information from a single frame. It should be noted, however, that multiple frames of portions of the area from different perspectives are used to generate the composite image. The tree canopy overlying the terrain results in significant obscuration of targets (e.g. vehicle 106) under that tree canopy. The points received by the sensor 103 of instrument 102 from the ground and the target 106 are thus sparse. Hence, a robust system for processing the points is required. Moreover, to be of the most value, an image of the ground wherein the target 106 can be perceived easily must be available quickly.

Extraction of data points generated by LADAR to produce a DEM is known. However, such methods are computationally intensive, and where a large number of data points are processed, run-time applications can be difficult and/or slow. Therefore, there is a need for more efficient methods and systems for production of DEMs using topological data points. In order to be sensitive enough to detect and discern scene content under heavy obscuration (trees, camouflage netting, etc.), the sensor 103 should be able to trigger on single photons.

In many cases the airborne LADAR data collected by the LADAR sensor 103 includes ringing (false images) caused by random events in the electronics of the sensor 103 and stray ambient photons that cause dark noise (false returns) to significantly obscure scene content. Effective filtering is required for registration of LADAR images because registration of images comprising too many noise points provides poor results. An efficient near real-time method is therefore needed to improve signal-to-noise ratio (SNR) by filtering out these false returns.

SUMMARY OF THE INVENTION

The above-discussed and other shortcomings of the prior art are addressed and overcome by the present invention which provides a system and method for improving the signal-to-noise ratio of scenes represented by data points such as those generated by reflected LADAR pulses. The method comprises loading the collected point data into a three-dimensional voxel array; determining connected components in the array; determining a size for each component and a hit count for each occupied voxel; and, for each voxel, determining whether an occupied voxel is to be written to an output file, wherein occupied voxels are written to the output file according to a set of criteria based on statistics on whether a voxel represents a light pulse reflected by a physical object.

DETAILED DESCRIPTION

Figure 1:
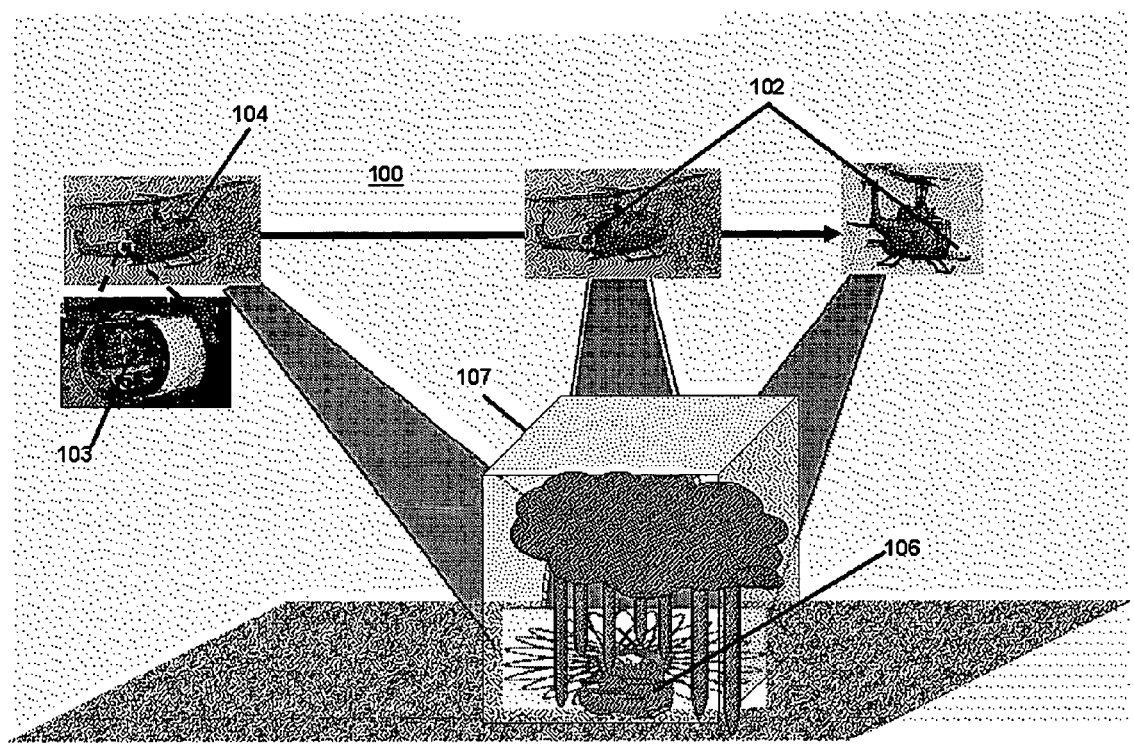
FIG. 1 is a depiction of an airborne LADAR instrument for processing images of a tree-covered terrain concealing a vehicle, according to known art.
Figure 2:
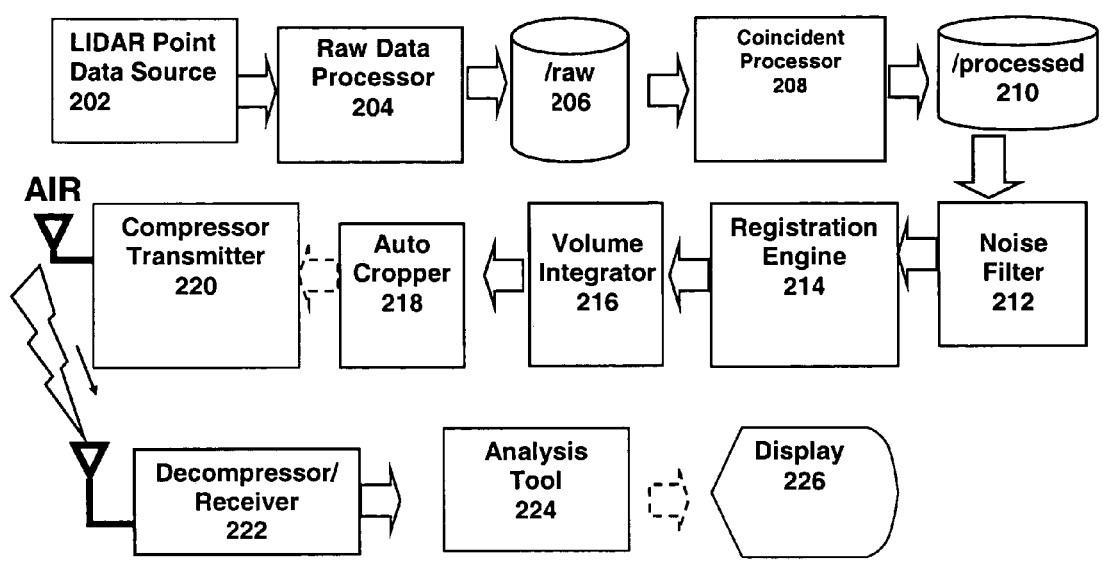
FIG. 2 is a high level block diagram showing a system and method for processing LADAR point data according to an embodiment of the invention.

Referring to FIG. 2, there is shown a high level block diagram representing a system and method 200 for processing LADAR point data using an embodiment of the invention. The system 200 comprises a source 202 of topographical data points. In this embodiment the source is an aircraft such as a helicopter. The source 202 provides raw data comprising points that are preferably a plurality of three-dimensional (3D) topographical point values provided by a LADAR instrument 102 and reflected to the sensor 103 as discussed with respect to FIG. 1.

For purposes of discussion we assume that a reconnaissance aircraft has spotted a potential target and a second aircraft equipped with LADAR is sent for a flyover of the target area. The second aircraft is the data source 202. The data is preferably processed in the air by blocks 204, 208, 212, 214, 216 and 218 and is then compressed by block 220 and downloaded to a ground analysis center where the target is identified by an analysis tool 224 for display 226 for interactive processing with a user.

Referring again to FIG. 2, the data source 202 provides a plurality of subframes to a data processor 204. These subframes comprise timing measurements and metadata which may be computationally transformed into frames (or volumes) of 3D points representing a complex multidimensional object such as the terrain shown in FIG. 1. In this embodiment, the object comprises a base surface (e.g., the ground or earth), a vehicle such as a tank 106, and a plurality of obstructions (e.g., tree tops) above the surface that conceal most of the tank 106. Each frame comprises the measurements collected by the sensor 103 over a given period of time (an exposure) as the aircraft 102 moves over the terrain where the vehicle is located. In the preferred embodiment, this time period is one quarter of a second and, with current instruments, that exposure results in collection of hundreds of thousands of points by the LADAR sensor 103.

System 200 improves on the performance of the prior art, at least in part, by using only data points representing the ground surface and a target 106 (if present) and not the obstructions at a height greater than a predetermined threshold above the ground. Using only the ground points greatly reduces the number of points that are to be down-linked and processed and thus reduces the time required to produce an accurate model of the terrain.

The data processor 204 receives a single field of view "subframe" from the data source 202 and logs it to a file. The file comprises the raw telemetry data produced by the source 202 and also includes a plurality (e.g., thousands) of timing measurements for light pulses reflected by a target or targets on the ground.

Storage space 206 stores the received raw data into a file comprising a log of the received items of telemetry and timing measurement data. The file is stored so that the raw data can be re-processed later, if required.

A coincident processor 208 receives the raw telemetry and timing measurement data, computationally converts these measurements into 3D angle-angle-range points, and performs a transformation of the LADAR data from its angle-angle-range format for locations of the points to an x-y-z coordinate space for producing a plurality of 3D volume frames to be stored in a set of processed frame files 210.

Processor 208 also performs coincident processing. This processing comprises performing a count of measurements received from the data source 202 and using the x,y,z data for organizing and storing the received point data in a three-dimensional (3D) array of voxels. The voxel array represents a space large enough to contain the sought target (e.g., a volume that is 30 meters on each side). The volume represented by each voxel is selected according to the resolution of the LADAR instrument used.

Processor 208 produces processed data in the form of a plurality of frame files. As the LADAR sensor 103 in the aircraft 104 flies over the target 106, different gaps in the tree cover are exposed such that LADAR flashes are reflected from the target through the gaps. The sensor 103 takes a plurality of "snapshots" or frames of data (e.g., at intervals that are a fraction of a second). Thus, a sufficient amount of point data is collected to obtain an image of the partially hidden target 106. The output of the processor 208 is stored in a storage area 210 from where it is provided to the noise filter 212. In the preferred embodiment each frame file comprises a two kilobyte header with information such as the time that the data was collected (the timestamp) and the location where the date was collected, along with global positioning information.

The data provided by the LADAR instrument 102 may comprise an effect known as dark noise. Dark noise is caused by random scattering of sunlight into the receiver, or random thermal or other effects within the sensor's detector and integrated electronics, which cause false measurements to appear in the frame imagery. The noise filter 212 filters the received point measurements to remove the dark noise. Different sensors have different dark count noise rates. Therefore, the filter 212 is not always required.

The filter 212 removes the dark noise by eliminating any false measurements received at the input of the filter 212. The filter 212 eliminates point data that is determined to be unreliable or unlikely to be a reflection of the target as will be discussed below. The filter 212 provides a filtered set of frames that includes the point data most likely to be the result of reflections of LADAR pulses from a physical object such as the target 106.

A registration engine 214 performs spatial alignment of the noise filtered frames via a process that may be similar to that discussed in the co-pending applications Ser. No. 10/892,047 and 10/891,950. Engine 214 produces a plurality of registered volumes of point measurements. The quality of the registration depends on a good signal-to-noise ratio because when false data points (noise) are used in the registration there is a high likelihood that there will be noise-to-noise point alignment resulting in a distorted registration image.

Next, a frame integrator (volume integrator) 216 performs a union of the registered volumes produced by the registration engine 214. In the course of combining the measurements of different frames for the same voxel, the mean 3D point return is computed and stored in the output frame. This union frame is provided to an auto cropper 218.

The auto cropper 218 automatically detects the ground plane by analyzing the Z histogram of the point data in the union frame, and crops the volume. to produce a composite image suitable for presentation to a user. Auto cropper 218 filters out points higher than the maximum expected vehicle height above the ground, removing the obstructions such as those from the top of the trees. As expected, the number of LADAR pulses that reach the ground through the trees and other foliage is much smaller than those emitted by the LADAR source (or emitter). Therefore, the points representing the ground (ground points) detected at the LADAR sensor 103 are commensurately fewer than the total number received from the totality of the terrain below the aircraft 104. In the embodiment discussed herein a target such as the tank 106 hidden under the treetops as shown in FIG. 1 would be depicted without the obscuring effect of the canopy of trees over the tank 106.

The preceding part of the process is preferably done in the aircraft 104 but there is further processing that can be done on the ground. Therefore, a compressor transmitter 220 is capable of receiving the cropped frame produced by the auto cropper 218 and compresses the frame using any known compression algorithm so that the data can be downloaded via a wireless transmission to a ground station where the data frame is decompressed (by a decompressor/receiver 222) and the cropped image frame is analyzed with the analysis tool 224 using a display 226 as is described in a co-pending patent application Ser. No. 10/892,063 which has been incorporated herein by reference.

Figure 3:
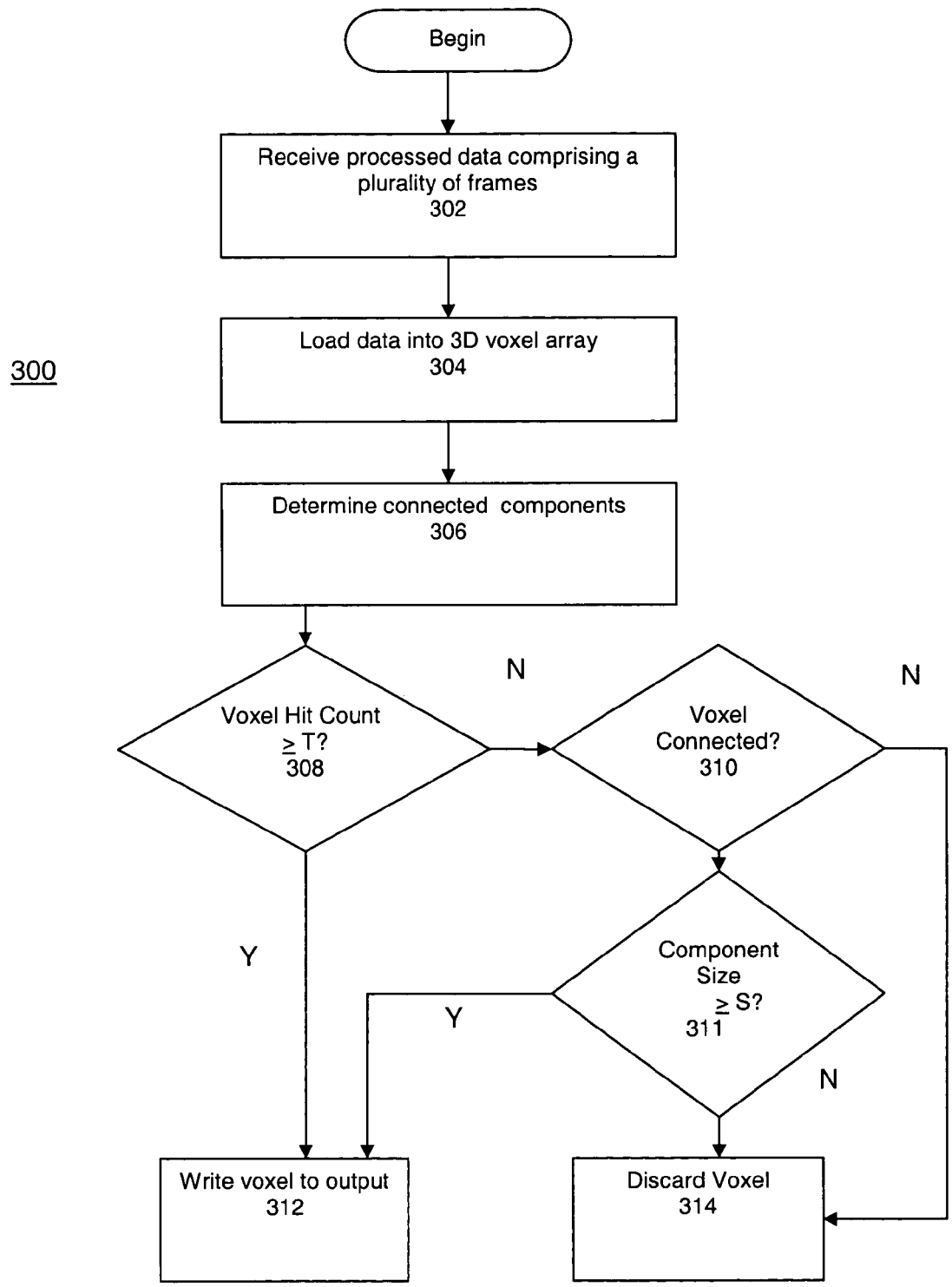
FIG. 3 is a flowchart of a method for improving the signal-to-noise ratio of LADAR scenes according to an embodiment of the invention.

Referring to FIG. 3, there is shown a flow chart illustrating a simplified method 300 practiced by the noise filter 212 according to an embodiment of the invention. The method is performed using a system such as the one described with respect to FIG. 2. In step 302, the system receives processed data comprising a plurality of frames. The noise filter 212 individually processes each frame by loading its point data into a 3D voxel array for processing thereof in step 304. As discussed above, this is done by using the x-y-z position data for each voxel of the frame, as well as the count of the number of LADAR measurements that went into the mean point position estimate for that voxel.

Next in step 306, the system determines connected components. This is done by analyzing each occupied voxel in the 3D voxel array to determine whether that occupied voxel touches (is contiguous with) another occupied voxel or voxels (i.e., whether it has occupied neighbors). An occupied voxel is one containing point data. This process can be done in two passes over the entire array, as is commonly known in the prior art. In the first pass, a 3×3×3 window of voxels is scanned over the entire 3D array one voxel at a time, visiting the voxels in raster scan order. If an occupied voxel is encountered, it is assigned the next available label. If any of the voxels in the 3×3×3 neighborhood of the current voxel have previously been assigned labels, then they are connected by the current voxel, and their label equivalence is noted using an equivalence list. During the second pass over the entire voxel array, each occupied voxel receives its final label based on the equivalence list, and the size of the individual components are computed based on the number of voxels assigned a particular label. Each object comprising such a set of connected voxels with the same label is called a connected component or simply a component. Connectivity of a group of voxels is important because it is unlikely that a large group of connected voxels would be the result of random noise.

Next, in step 308 the system checks component size and hit count to determine if an occupied voxel should be removed by the noise filter or written to an output file. The component size is the number of connected occupied voxels and the hit count is the number of data points per voxel (i.e., the number of LADAR measurements received in a given voxel).

Each voxel is written to an output file in step 312 if it satisfies a hit threshold, T. In other words, points with a hit count $\geq T$ are kept regardless of their connectivity. Such a threshold is set possibly using statistical or historic data on which data points represent an actual reflection of a LADAR pulse beam (possibly at the photon level) as opposed to data points produced by other phenomena (dark noise).

Sometimes voxels with low hit counts actually represent points reflected by physical objects. Another indicator of valid reflections is the presence of neighboring scene structure, which is captured by connectivity to other occupied voxels. Therefore, a test is made in step 310 to determine if a voxel is connected. Therefore, if a given voxel does not satisfy a hit count threshold (such as two hits) in step 308 the filter 212 then determines whether the voxel is a part of a (connected) component in step 310. If the voxel is part of a component, then a further determination is made in step 311 as to whether the size of the component satisfies a predetermined component size threshold. If it does, then the voxel is written to an output file that is sent to the registration engine 214. Points belonging to a connected component with size $\geq S$ are kept regardless of their hit count. Again, the choice of the threshold should be made based on heuristics applying to the specific application contemplated. Thus a voxel is discarded (not passed to the output) in step 314 only if it fails both the count threshold test and the connectivity threshold test.

Use of a filter according to the invention has been empirically shown to result in a reduction of 44% of the points to be processed for targets under trees and 28% for targets in the open, based on data collected during several flight tests.

The system discussed above is preferably an information processing system such as a microprocessor powered computer. The method can be implemented as a software product executed by a programmable general purpose computer apparatus, such as the one discussed above or as a set of machine executable instructions embedded in a semiconductor memory, or as a special-purpose processing device or application-specific integrated circuit (ASIC).

Therefore, while there has been described what is presently considered to be the preferred embodiment, it is understood by those skilled in the art that other modifications can be made within the spirit of the invention.

We claim:

1. A method for processing scenes comprising point data reflected from a space comprising a target, the method comprising:

receiving telemetry and timing measurement data;

computationally converting the telemetry and timing measurement data into three-dimensional angle-angle-range points and into an x-y-z coordinate space for producing a plurality of three-dimensional volume frames and coincident processing to produce a three-dimensional array of voxels as a plurality of frame files as a voxel array;

processing the data within a noise filter by determining whether each voxel in the voxel array is an occupied voxel, an occupied voxel being a voxel containing point data;

determining a hit count for each occupied voxel, wherein the hit count is a number of data points per voxel;

determining for each occupied voxel, whether the hit count satisfies a hit threshold;

writing to an output file those occupied voxels that meet a hit count threshold that is set using statistical or historic data on which the data points represent a reflection of a LADAR pulse beam so as to remove noise from the point data and produce filtered frames;

spatially aligned filtered frames;

performing a union of registered volumes to produce a union frame; and detecting a ground plane by analyzing a Z histogram of point data in a union frame and cropping the volume to produce a composite image for presentations to a user.

2. The method of claim 1, wherein if an occupied voxel does not satisfy the hit threshold the method further comprises:
   determining whether the occupied voxel is a connected voxel, wherein connected voxels form a connected component;
   determining a size of the connected component if it is determined that the occupied voxel is a connected voxel; and
   writing the occupied voxel to the output file if the size of the connected component satisfies a size threshold.

3. The method of claim 2, wherein determining whether each voxel in the voxel array is an occupied voxel comprises scanning the voxel array using a window of voxels, if an occupied voxel is encountered, the occupied voxel is assigned a label and if any of the voxels within the window of voxels has been previously assigned a label it is determined that the voxel is connected by reference to an equivalence list comprising information on label equivalence such that all voxels having equivalent labels are part of a connected component.

4. The method of claim 3, further comprising:
   scanning the voxel array a second time;
   assigning each occupied voxel encountered a final label based on the equivalence list; and
   determining a size for a connected component based on the number of voxels assigned a final label corresponding to the connected component.

5. The method of claim 1 further comprising determining connected components by searching a 3×3×3 voxel window centered around the occupied voxel in the voxel array to determine the connected components.

6. The method of claim 1 comprising collecting information on a volume having a user selected size sufficiently large to encompass the volume occupied by a target of known size to generate the voxel array.

7. The method of claim 1 further comprising processing LADAR point data to create the scenes.

8. A system for processing data representing a ground surface and target, comprising:
   a data source that generates telemetry and timing measurement data relating to a ground surface and target;
   a processor for converting the telemetry and timing measurement data into three-dimensional angle-angle-range data points and into an x-y-z coordinate space for producing a plurality of three-dimensional volume frames and a three-dimensional array of voxels as a plurality of frame files as a voxel array;
   a noise filter that receives the frame files as a voxel array and determines whether each voxel in the voxel array is an occupied voxel that contains point data while determining a hit count as a number of data points per voxel and whether the hit count satisfies a hit threshold and writing to an output file those occupied voxels that meet a hit count threshold that is set using statistical or historic data on which the data points represent a reflection of a LADAR pulse beam so as to remove noise from the point data and produce filtered frames;
   a registration engine for aligning the filtered frames to produce a registered volume;
   a frame integrator that performs a union of registered volumes to produce a union frame; and
   an auto cropper that detects a ground plane by analyzing a Z histogram of point data in a union frame and cropping the volume to produce a composite image for presentation to a user.

9. The system according to claim 8, wherein the noise filter is operative for determining whether an occupied voxel is part of a connected component.

10. The system according to claim 9, wherein the noise filter is operative for determining the size of a connected component and writing the occupied voxel to an output file if the component size satisfies a predetermined size threshold.

11. The system according to claim 10, wherein said noise filter is operative for computing the size based on a number of voxels assigned a particular label.

* * * * *